United States Patent [19]
Karstedt

[11] 3,715,334
[45] Feb. 6, 1973

[54] PLATINUM-VINYLSILOXANES

[75] Inventor: Bruce D. Karstedt, Scotia, N.Y.

[73] Assignee: General Electric Company, Waterford, N.Y.

[22] Filed: Nov. 27, 1970

[21] Appl. No.: 93,435

Related U.S. Application Data

[60] Continuation of Ser. No. 834,580, March 19, 1969, abandoned, which is a division of Ser. No. 152,476, Aug. 14, 1968, abandoned, which is a continuation-in-part of Ser. Nos. 598,148, Dec. 1, 1966, abandoned, and Ser. No. 598,216, Dec. 1, 1966, abandoned.

[52] U.S. Cl......260/46.5 UA, 260/37 SB, 260/45.75, 260/46.5 G, 260/46.5 E, 260/448.2 Q, 260/825, 260/827

[51] Int. Cl..............................................C08f 11/04

[58] Field of Search........260/46.5 P, 46.5 U, 46.5 G, 260/825, 827, 448.2 Q

[56] References Cited

UNITED STATES PATENTS

| | | | |
|---|---|---|---|
| 3,419,593 | 12/1968 | Willing | 260/448.2 |
| 3,474,123 | 10/1969 | Kelly et al. | 260/448.2 |
| 3,159,601 | 12/1964 | Ashby | 260/448.2 |
| 3,159,662 | 12/1964 | Ashby | 260/46.5 |

*Primary Examiner*—Donald E. Czaja
*Assistant Examiner*—Melvyn I. Marquis
*Attorney*—E. Philip Koltos

[57] ABSTRACT

Hydrosilation catalysts are provided in the form of platinum-vinylsiloxanes which are substantially free of chemically combined halogen. The platinum-vinylsiloxanes can be made by effecting removal of chemically combined halogen from a platinum halide-vinylsiloxane reaction product. The platinum-vinylsiloxanes can be employed as hydrosilation catalysts to make curable organopolysiloxane compositions.

7 Claims, No Drawings

PLATINUM-VINYLSILOXANES

This application is a continuation of application Ser. NO. 834,580, filed Mar. 19, 1969, which is a division of application Ser. No. 752,476, filed Aug. 14, 1968, which in turn is a continuation-in-part of applications Ser. No. 598,148 and 598,216, both filed Dec. 1, 1966 all now abandoned.

The present invention relates to platinum-vinyl-siloxanes, methods for making them and to their use as hydrosilation catalysts.

Prior to the present invention, various hydrosilation methods were known for effecting the addition of an organosilicon material, having a hydrogen atom attached to silicon, to an aliphatically unsaturated material having either olefinic or acetylenic unsaturation resulting in the formation of an adduct having a new silicon-carbon linkage. The reaction is illustrated with respect to the olefinic double bond as follows:

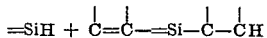

Many of the known hydrosilation methods involve the employment of a platinum catalyst in the form of a halogenated platinum compound, or finely divided platinum metal. For example, Speier U.S. Pat. No. 2,823,218 utilized chloroplatinic acid as the platinum catalyst. Another method is Bailey U.S. Pat. No. 2,970,150 which shows the employment of platinum metal supported on a finely divided carrier, such as charcoal. Additional methods are shown by Ashby U.S. Pat. Nos. 3,159,601 and 3,159,662, and Lamoreaux patent 3,220,927, all of which are assigned to the same assignee as the present invention.

Although the above-described platinum catalyzed hydrosilation methods provide for valuable results, the parts by weight of platinum metal values, per million parts of hydrosilation mixture, required for effective results, often render these methods economically unattractive. In many instances, for example, substantial amount of platinum metal values are rendered catalytically inactive and beyond recovery. The loss of platinum values can be aggravated by the fact that the use of excessively high parts by weight of platinum catalyst are sometimes required to achieve desirable hydrosilation rates. However, it has been found in particular instances that the rate of hydrosilation is sometimes diminished when some of the prior art platinum catalysts are utilized above normal catalyst concentration.

Prior to the present invention, therefore, platinum catalyzed hydrosilation methods often resulted in the loss of an undesirable amount of platinum metal values. In addition, the limited cure rate provided by the employment of prior art platinum catalyst has often limited the extension of hydrosilation as a cure mechanism in organopolysiloxane compositions.

The present invention is based on my discovery that significantly improved hydrosilation results can be achieved with catalysts in the form of platinum-vinylsiloxanes which are substantially free of chemically combined halogen. Prior to the present invention, hydrosilation catalysts derived from platinum halides generally had an average ratio of at least two halogen atoms, per platinum atom.

The platinum-vinylsiloxanes of the invention can be made in accordance with the practice of the invention by effecting the removal of chemically combined halogen from a platinum halide-vinylsiloxane reaction product which is made from a platinum halide and certain vinyl containing organosilicon materials defined hereinafter. More particularly, the platinum-vinylsiloxanes can be made either in a stepwise manner by making a platinum halide-vinylsiloxane as an intermediate reaction product, and effecting the removal therefrom of chemically combined halogen, or by removing chemically combined halogen from a mixture of the platinum halide and the vinyl containing organosilicon material in accordance with the practice of the invention. Chemically combined halogen in the platinum-vinylsiloxane of the present invention can be calculated by employing the Disodium Biphenyl procedure as shown in Analytical Chemistry, Vol. 22, 311 (Feb. 1950). The platinum content of the platinum-vinylsiloxanes of the present invention can be calculated by any of the well known procedures of the art, for example, Atomic Spectroscopy as taught by R. Dockyer and G.E. Hawes, The Analyst 84,385 (1959).

Although I do not wish to be bound by theory, I have found that in order to produce the platinum-vinylsiloxanes of the present invention, there must be utilized (A) a platinum halide, and (B) a vinyl containing organosilicon material selected from a. vinylsilanes of the formula, (1)
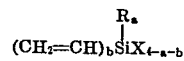

and b. vinylsiloxanes consisting essentially of chemically combined units of the formula (2)
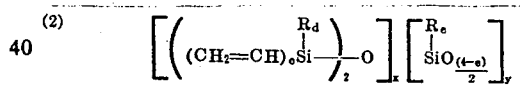

where R is selected from monovalent hydrocarbon radicals, and halogenated monovalent hydrocarbon radicals, X is a hydrolyzable radical, $a$ is a whole number having a value between 0 to 2 inclusive, $b$ is a whole number having a value between 1 to 4 inclusive, the sum of $a$ and $b$ is equal to 1 to 4 inclusive, $c$ is an integer equal to 1 to 3 inclusive, $d$ is a whole number equal to 0 to 2 inclusive, $e$ is a whole number equal to 0 to 3 inclusive, $x$ is an integer equal to 1 to 100 inclusive, $y$ is a whole number equal to 0 to 198 inclusive and the sum of $x + y$ is equal to 1 to 199 inclusive. Preferably the sum of $x + y$ is equal to 1 to 30 inclusive.

Radicals included tolyl, xylyl, etc. radicals; aralkyl R of formulas 1 and 2 are, for example, alkyl radicals, such as methyl, ethyl, propyl, butyl, pentyl, hexyl, heptyl, octyl, etc; alkenyl radicals such as vinyl, allyl, 1-butenyl, etc.; cycloalkyl radicals such as cyclohexyl, cycloheptyl, etc.; aryl radicals such as phenyl, methyl, tolyl, teylyl, etc. radicals; aralkyl radicals such as benzyl, phenylethyl, phenylpropyl, etc. radicals; halogenated radicals of the aforementioned types including chloromethyl, chloropropyl, chlorophenyl, dibromophenyl, etc. radicals. In the above formulas where R can represent more than one radical, these radicals can be all the same or any two or more of the aforementiond R radicals, respectively.

Unsaturated silanes included by formula (1) are, for example, tetra-vinylsilane, divinylallylmethylsilane, divinyldimethylsilane, tri-vinylphenylsilane, divinyl-methylchlorosilane, tri-vinylchlorosilane, divinyl-methylethoxysilane, divinylmethylacetoxysilane, etc.

There are included by formula (2), vinyldisiloxanes of the formula,

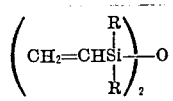

such as 1,3-divinyl-tetramethyldisiloxane, hexavinyldisiloxane, sym-divinyl-tetraphenyldisiloxane, 1,1,3-trivinyl, trimethyldisiloxane, sym-tetravinyldimethyldisiloxane, etc.

There is also included by the vinylsiloxane of formula (2), vinylcyclopolysiloxanes such as 1,3,5-trivinyl, 1,3,5-tri-methylcyclotrisiloxane, 1,3,5,7-tetravinyl, 1,3,5,7-tetramethylcyclotetrasiloxane, 1,3-divinyl, octaphenylcyclopentasiloxane, etc.

The platinum halides which can be employed in the practice of the invention are for example $H_2PtCl_6 \cdot nH_2O$ and metal salts, such as $NaHPtcl_6 \cdot (H_2O)_n$, $KHPtcl_6 \cdot nH_2O$, $Na_2PtCl_6 \cdot nH_2O$, $K_2PtCl_6 \cdot nH_2O$.

Also, $PtCl_4 \cdot nH_2O$ and platinous type halides, such as $PtCl_2$, $Na_2PtCl_4 \cdot nH_2O$, $H_2PtCl_4 \cdot nH_2O$, $NaHPtCl_4 \cdot nH_2O$, $KHPtCl_4 \cdot nCE2O$, $K_2PtBr_4$.

In addition, platinum halide complexes with aliphatic hydrocarbon as taught in Ashby U.S. Pat. Nos. 3,159,601 and 3,159,662 for example, $|(CH_2=CH_2)|_2 \cdot PtCl_2$ ; $(PtCl_2 \cdot C_3H_6)_2)$ , etc. Other platinum halides which can be utilized as shown by Lamoreaux U.S. Pat. No. 3,220,972, such as the reaction product of chloroplatinic acid hexahydrate and octyl alcohol, etc.

There is provided by the present invention, a method for making (A) a platinum-vinylsiloxane substantially free of chemically combined halogen and having from about 0.5 percent to about 46 percent of chemically combined platinum of the formula, (3) 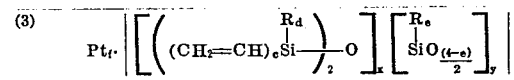

where R, c, d, e, x and y are as previously defined, and $f$ can have a value between about 0.67 to about 67, while $f/x$ can have a value up to about 0.67, which process comprises, 1. effecting removal of chemically combined halogen from (B) a platinum halide containing organosilicon material, and
2. recovering (A) from the resulting product of (1), where (B) has a ratio of at least two halogen atoms, per platinum atom, and is a member selected from
   a. a reaction product of said platinum halide and a vinylsiloxane of formula (2)
   b. a mixture of a platinum halide and a vinyl containing organosilicon material selected from a silane of formula (1) and a vinylsiloxane of formula (2).

The platinum-vinylsiloxane of the present invention is subject to decomposition at temperatures above 0°C, when allowed to remain in contact with greater than one mole of water, per gram atom of platinum over extended periods of time. It has been found expedient to maintain the platinum-vinylsiloxane under substantially anhydrous conditions. Temperatures between −50° to 50°C have been found desirable shelf temperatures.

The expression "substantially free of chemically combined halogen" used in describing the platinum-vinylsiloxane of the present invention, is not intended to include chemically combined halogen which is derived from halogenated hydrocarbon radicals of formulas (1) and (2). In instances where vinyl containing organosilicon material of formula (1) or (2) is utilized in making the platinum-vinylsiloxane, having halogenated hydrocarbon radicals attached to silicon by silicon-carbon linkages, the halogen attached to carbon of such vinyl containing organosilicon material must be substracted from the total halogen found in the platinum-vinylsiloxane, as determined by the Disodium Biphenyl method previously described. In particular situations, the platinum-vinylsiloxane of the present invention can be associated with minor amounts of platinum halides or platinum halide complexes of the prior art, so that the average ratio of halogen atoms to platinum atoms of the platinum-vinylsiloxane of the present invention as determined by the Disodium Biphenyl method does not exceed 0.1. Preferably, the platinum-vinylsiloxane of the present invention is substantially free of detectable chemically combined halogen in accordance with the Disodium Biphenyl method as previously described. Preferably, the platinum-vinylsiloxane of the present invention can contain from about 1.5 percent to about 41 percent by weight of platinum, based on the weight of platinum-vinylsiloxane.

Included by the platinum-vinylsiloxane of formula (3) are platinum-vinyldisiloxanes of the formula, (4) 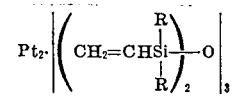

and platinum-vinylcyclopolysiloxanes of the formula, (5) 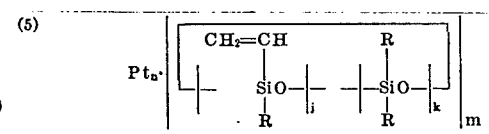

where R is as defined above, $j$ is an integer equal to 2 to 8 inclusive, $k$ is a whole number equal to 0 to 6 inclusive, and the sum of $j$ and $k$ is equal to 3 to 8 inclusive, $m$ is an integer equal to 1 to 25 inclusive, and n has a value equal to 0.67 to 67.

The following are some of the platinum-disiloxanes included by formula (4),

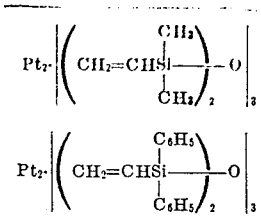

Some of the platinum-vinylcyclopolysiloxanes of formula (5) have the following average formula,

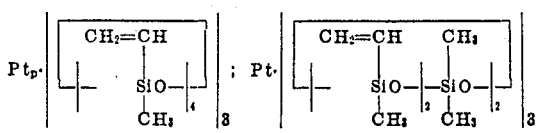

where $p$ is an integer equal to 1 to 4 inclusive.

The platinum-vinylsiloxanes of the present invention can be employed as a platinum containing master batch to make flame retardant organopolysiloxane elastomers as taught for example, in French U.S. Pat. No. 1,486,530. There can be utilized for example, an amount of the platinum-vinylsiloxane of the present invention to provide for about 1 part or less of platinum per million parts of organopolysiloxane elastomer composition to impart flame retardancy in the cured product.

The platinum-vinylsiloxanes of the present invention also can be utilized to make curable organopolysiloxane compositions having improved cure rates. These curable organopolysiloxane compositions can be employed in dental applications where a fast cure rate is often desirable. In addition, the platinum-vinylsiloxanes of the present invention can be employed as a hydrogenation and dehydrogenation catalyst, for preparing various organic compounds, such as antibiotics, and for reforming hydrocarbons, etc.

In addition to the platinum-vinylsiloxane and method for making such materials, there is also provided by the present invention, a hydrosilation method for the production of organosilicon adducts containing silicon-carbon bonds, as a result of contacting (C) a silicon material containing per molecule, at least one hydrogen atom attached to silicon, there being not more than two hydrogen atoms attached to any one silicon atom, referred to hereinafter as the "silicon hyride," with (D) a material containing aliphatic carbon atoms linked by multiple bonds, referred to hereinafter as the "aliphatically unsaturated material." The method of the present invention provides for the improvement of contacting (C) and (D) as previously defined, in the presence of an effective amount of the platinum-vinylsiloxane of formula (3).

Some of the silicon hydrides which can be utilized in the practice of the hydrosilation method of the present invention are for example, organosilanes of the formula, $$H_q Si(Z)_r X_{4-q-r} \qquad (6)$$

Organocyclopolysiloxanes of the formula, $$(HZSiO)_s \qquad (7)$$

Organopolysiloxane polymers of the formula, $$H_t Z_u SiO_{(4-t-u)/2} \qquad (8)$$

where X is as defined above, Z is selected from monovalent hydrocarbon radicals, halogenated monovalent hydrocarbon and cyanoalkyl radicals, $q$ is an integer equal to 1 or 2, $r$ is a whole number equal to 0 to 3 inclusive, and the sum of $q$ and $r$ is equal to 1 to 4 inclusive, $s$ is an integer equal to 3 to 18 inclusive, $t$ has a value equal to 0.0001 to 1 inclusive, $u$ has a value equal to 0 to 2.5 inclusive, and the sum of $t$ and $u$ is equal to 1 to 3 inclusive.

The aliphatically unsaturated material which can be utilized in combination with the above described silicon hydride in the practice of the hydrosilation method of the present invention can contain olefinic or acetylenic unsaturation and can include substantially all of the aliphatically unsaturated compounds known to the art. The aliphatically unsaturated materials can contain carbon and hydrogen only, or can contain carbon and hydrogen chemically combined with another element or elements. In instances where the aliphatic unsaturated material contains elements other than carbon and hydrogen, it is preferred that these elements be either oxygen, halogen, nitrogen, and silicon, or mixtures of these elements. The aliphatically unsaturated material can contain a single pair of carbon atoms linked by multiple bonds, or it can contain a plurality of such aliphatically unsaturated bonds. As an illustration of the aliphatically unsaturated hydrocarbons which can be employed are for example, ethylene, propylene, butylene, octylene, styrene, butadiene, pentadiene, pentane-2, divinylbenzene, vinylacetylene, cyclohexene, etc. Higher molecular weight materials having a least 20 to 30 atoms also can be used, etc.

In addition to the above described hydrocarbons, there also can be included oxygen containing aliphatically unsaturated materials, such as methylvinyl ether, divinylether, phenylvinyl ether, monoallyl ether of ethylene glycol, allyl aldehyde, methylvinyl ketone, phenylvinyl ketone, acrylic acid, methacrylic acid, vinylacetic acid, vinylacetate, linoleic acid, etc. Heterocyclic materials also are included, such as cyclohexene, cycloheptene, dihydrofuran, dihydropyrene, etc. Additional aliphatic unsaturated materials are for example, acrylonitrile, allylcyanate, nitroethylene, etc.

There are also included by the silicon containing aliphatically unsaturated materials of the present invention, aliphatically unsaturated silanes of the formula, $$Z_v Si(Y)_w X_{4-v} \qquad (9)$$

aliphatically unsaturated cyclopolysiloxanes, $$(Z Y SiO)_x \qquad (10)$$

and aliphatically unsaturated polymers, $$Y_t Z_u SiO_{(4-t-u)/2} \qquad (11)$$

where Z, X, $t$ and $u$ are defined above, and Y is a monovalent aliphatically unsaturated radical selected from aliphatically unsaturated hydrocarbon radicals and halogenated aliphatically unsaturated radicals, $v$ is a whole number having a value of 0 to 3 inclusive, $w$ is an integer equal to 1 to 4 inclusive, the sum of $v$ and $w$ can be equal to 1 to 4 inclusive and $x$ is an integer equal to 3 to 18 inclusive.

Radicals included by Z of the above formulas are for example, all of the aforementioned R radicals and cyanoalkyl radicals, such as cyanoethyl, cyanopropyl, cyanobutyl, etc. Radicals included by X are for example, halogen radicals, such as chloro, bromo, iodo, etc.; alkoxy radicals and aryloxy radicals, such as methoxy, ethoxy, propoxy, phenoxy, etc.; acyloxy radicals, such as acetoxy, propenoxy, etc.

In addition to the platinum-vinylsiloxane of the present invention and the hydrosilation method defined above employing the platinum-vinylsiloxane as a hydrosilation catalyst, there is also included by the present invention curable orgnopolysiloxane compositions having at least 0.01 part of platinum per million parts to organopolysiloxane of formula (11), where preferably the sum of t and u is equal to 1.95 to 2.01, and there is from 1 to 200 parts of platinum, per million parts of organopolysiloxane. The organopolysiloxanes included by formula (11) can be fluids, gums and resins depending upon the ratio of Z and Y radicals to silicon. The curable organopolysiloxane compositions of the present invention can be employed as potting compounds, encapsulents, etc. If desired, these curable organopolysiloxane compositions also can contain from 10 to 300 parts of filler for example, reinforcing fillers such as silica fillers and non-reinforcing fillers such as carbon black, etc.

In the practice of the invention, the platinumvinylsiloxane can be made by the removal of chemically combined halogen from a platinum halide-vinylsiloxane made in accordance with the practice of the present invention. The platinum halide-vinylsiloxane can be made by effecting reaction between a vinyl containing organosilicon material, as shown by formulas (1) and (2), and a platinum halide. Removal of chemically combined halogen in accordance with the practice of the invention can be achieved directly with the platinum halide-vinylsiloxane, or it can be achieved with a mixture of the platinum halide and the vinylsiloxanes. The platinum-vinylsiloxane can thereafter be recovered from the resulting reaction mixture in order to effect the removal of undesirable materials such as starting reactants, reaction by-products, etc.

Experience has shown that effective results can be achieved in forming the platinum-vinylsiloxane, if there is utilized sufficient vinyl containing organosilicon materials, such as vinylsilane or vinylsiloxane in combination with the platinum halide, to provide for at least one mole of the structural unit,

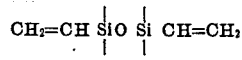

per gram atom of platinum, where the unoccupied valences of said structural unit are satisfied by oxygen atoms, R radicals or mixtures thereof. Preferably, sufficient vinyl containing organosilicon material should be employed to provide for three moles of the above structural unit, per two gram atoms of platinum. Experience has shown, however, that the proportions of the vinyl containing organosilicon material and the platinum halide can vary widely. For economic reasons, however, it has been found desirable to utilize excess of the vinyl containing organosilicon material to avoid undue loss of platinum values. After the platinum halide and the vinyl containing organosilicon material have been mixed together, various procedures can be employed to make the platinum-vinylsiloxane depending upon the nature of the platinum halide and the vinyl containing organosilicon material utilized. For example, in some instances a temperature between −50°C to 200°C can be employed, while a preferred temperature is between 0° to 100°C. In order to provide for the removal of chemically combined halogen, it has been found expedient to insure that an amount of water is present in the mixture, which if expressed in number of moles, would be at least equal to the number obtained by multiplying the gram atoms of platinum by their valence number. Excessive amounts of water should be precluded to avoid decomposition or impairment of activity of the platinum-vinylsiloxane after it has been formed. Experience has shown, however, that in all instances, unless water is specifically excluded, more than the minimum amount of water is generally present in the mixture due to atmospheric moisture, water chemically combined or associated in the reactants, solvents, etc. employed during the preparation of the platinum-vinylsiloxane.

One procedure which has been found effective for removing chemically combined halogen from the reaction mixture is a plural stripping technique in moist air with employment of heat and reduced pressure, such as pressures of about $10^{-3}$ mm, or above, or in place of reduced pressure an inert gas also can be used.

Another technique which has been found effective for removing chemically combined halogen, is the employment of a base, which also serves to neutralize halogen acid which can be present in the mixture. Suitable bases are for example, alkali carbonate, such as sodium carbonate, potassium carbonate, sodium bicarbonate, etc., alkali earth carbonates and bicarbonates, alkali hydroxides, such as sodium hydroxide, potassium hydroxide, etc. The employment of base, in the moderate excess of that required to neutralize all chemically combined halogen, to form corresponding salts, provides for effective results. An amount of base should be employed, which is at least sufficient to provide for the removal of substantially all chemically combined halogen within the scope of the present invention. Additional base, such as alkali bicarbonate should be employed when utilizing vinyl containing organosilicon material having halogen attached to silicon. In addition to stripping and base treatment, additional methods can be employed to effect the removal of chemically combined halogen from the mixture of the vinyl containing organosilicon material and the platinum halide. For example, absorbents such as molecular sieves can be employed. Suitable commercially available molecular sieves having mesh sizes between 30–120 and at least 4A diameter can be utilized.

Stannous chloride, $SnCl_2 \cdot H_2O$, can be used to remove chemically combined halogen from platinum halides insoluble in organic solvents, for example $K_2PtCl_4$. Provided it is removed quickly, the platinum-vinylsiloxane can be made in an aqueous medium. The recovery of the platinum-vinylsiloxane can be achieved by employing a non-polar organic solvent, while excess chemically combined halogen will be left in the aqueous medium.

The employment of an organic solvent has been found expedient to facilitate contact between the platinum halide and the vinyl containing organosilicon material when initially mixed together. In some instances, a mixture of the organic solvent and water can be employed, while in other situations, the vinyl containing organosilicon material itself can serve as a solvent. The nature of the solvent can vary depending upon the type of platinum halide utilized, as well as the nature of the vinyl containing organosilicon materials. Generally, however, there can be utilized hydrocarbon solvents, such as aromatic hydrocarbon, alcohols for example, ethyl alcohol, as well as other low molecular weight aliphatic alcohols, ethers, etc.

Depending upon the method of treatment employed to remove chemically combined halogen from the resulting platinum-vinylsiloxane, various impurities such as salts, molecular sieves, etc., can be associated with the platinum-vinylsiloxane. A convenient method for removing undesirable materials is to strip the reaction mixture of solvent, and then extract the platinum-vinylsiloxane with a suitable solvent, such as a non-polar hydrocarbon solvent, followed by filtration.

It has been found in most instances when the platinum-vinylsiloxane forms, that new infrared absorption frequencies appear at 7.5 – 7.6 microns and 8.34 microns. In addition, if a vinyl containing organosilane is utilized, vinylsiloxane can be formed by hydrolysis of hydrolyzable radicals. Cleavage of vinyl radicals from silicon also can occur when two or more are attached to the same silicon atom.

If desired, the platinum made in accordance with the invention can be blended with additional organopolysiloxane, such as fluid, gums and resins over wide proportions by weight. The mixing of the ingredients can be achieved by milling in instances where the organopolysiloxane is a gum, or by the employment of a solvent where it is a resin. Alternatively, where the organopolysiloxane and platinum-vinylsiloxane are fluids, mere mixing of the ingredients can suffice.

In order that those skilled in the art will be better able to practice the invention, the following examples are given by way of illustration and not by way of limitation. All parts are by weight.

Example 1

There is added 27.8 part of 1,3-divinyltetramethyldisiloxane to 19.5 parts of $(PtCl_2 \cdot C_2H_4)_2$. The mixture is then slowly warmed to 30°C over a period of 1 hour and maintained for an additional hour at 25° to 30°C with the aid of an ice bath. During this period, ethylene gas is continuously evolved producing a yellow-red liquid and orange solid. Analysis of the product shows that it has a ratio of about 2 atoms of chlorine, per atom of platinum.

Benzene is added to the above mixture and it is stirred for a period of about 2 hours. There is then added about 48 parts of ethyl alcohol containing about 4 ½% by weight of water. An exothermic reaction occurs and the reaction mixture is cooled to maintain it at 25° to 30°C. There is obtained a yellow-red solution after the addition is completed. There is then added to the mixture 12.5 parts of sodium bicarbonate resulting in a vigorous evolution of gas. The addition of the sodium bicarbonate is controlled to moderate the rate of gas evolution. After stirring the mixture for an hour at room temperature, it is filtered. The solids are then washed with a mixture of ethanol and benzene. The filtrate is then vacuum stripped of volatiles and a 95% yield of a yellow-red oil is obtained based on starting reactants. Analysis of the product by infrared shows that it is a complex of a 1,3-divinyltetramethyldisiloxane having an out of plane shift of =CH bending from 10.5 microns to 10.7 microns. Analysis for chlorine by the Disodium Biphenyl method showed it is substantially free of chemically combined chlorine. Platinum analysis shows it contains about 42% platinum. Based on method of preparation and analysis, the product is a platinum-vinyldisiloxane having the formula,

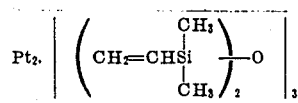

The platinum-vinylsiloxane is added to an organopolysiloxane mixture having a viscosity of about 4,000 centipoises at 25°C of polydimethylsiloxane having terminal dimethylvinylsiloxy units and a copolymer composed of chemically combined $SiO_2$ units, $(CH_3)_3SiO_{0.5}$ units and $(CH_2=CH)CH_3SiO$ units in an amount to provide for a platinum containing organopolysiloxane composition having 2 parts of platinum, per million parts of mixture. Another platinum containing organopolysiloxane composition is made following the same procedure, containing 10 parts of platinum, per million parts of organopolysiloxane.

Other mixtures are prepared following the same procedure with a variety of prior art platinum halides, to produce mixtures of 2 parts of platinum, per million parts of organopolysiloxane, and 10 parts of platinum, per million parts of organopolysiloxane.

There are added to 100 parts of each of the above-described platinum containing organopolysiloxane mixtures, 5 parts of a copolymer of chemically combined $SiO_2$ units and $H(CH_3)_2SiO$ units. The table below shows the results obtained with the various platinum containing organopolysiloxane mixtures containing either the platinum-vinylsiloxane of the present invention (Karstedt) or other platinum halides. In the table there is shown the time required in minutes to achieve a non-pourable condition, "No Flow Time" with the various platinum containing organopolysiloxane mixtures at about 25°C.

TABLE

| | PPM/Pt. | No Flow Time |
|---|---|---|
| Karstedt | 2 | 10 |
| | 210 | 16 |
| 1,5-hexadiene platinum dichloride | 1770 | 205 |
| $H_2PtCl_6 \cdot 6H_2O$ | 2840 | 568 |
| $(CH=CH_2 \cdot PtCl_2)_2$ | 1440 | 228 |
| $Na_2PtCl_4 \cdot 4H_2O$ | | 2880 |

Based on the above results, those skilled in the art would know that the platinum-vinylsiloxane of the present invention provides for significantly improved cure times as a hydrosilation catalyst with curable organopolysiloxane mixtures. In addition, the above results also show the valuable advantages achieved with platinum containing organopolysiloxane compositions containing the platinum-vinylsiloxane of the present invention, which can be cured at significantly faster rates at the same parts per million of platinum, as compared to prior art platinum containing organopolysiloxane compositions. The advantages are dramatically shown by the above results where the no flow time utilizing the platinum-vinylsiloxane at concentrations sufficient to provide 2 parts of platinum per million parts of mixture, is about the same as that achieved with 1,5-hexadiene platinum dichloride, utilized at 10 parts of platinum, per million parts of mixture.

Example 2

There was added 25 parts of sodium bicarbonate to a mixture of 25 parts of sodium chloroplatinite, 50 parts of 1,3-divinyltetramethyldisiloxane and 125 parts of ethyl alcohol. The mixture was heated for 15 minutes at a temperature between 70° to 75°C. The mixture was filtered, the resulting solids were washed with ethyl alcohol and combined with the filtrate. The filtrate was then vacuum stripped of volatiles. The residue was dissolved in 25 parts of benzene, filtered and again vacuum stripped of volatiles. There was obtained 35.6 parts of a red-brown transparent oil.

The oil crystallized at −13°C. Infrared showed the presence of a divinyltetramethyldisiloxane having an out of plane shift of =CH bending from 10.5 microns to 10.7 microns. There also was absorbence at 7.5 −7.6 microns and 8.34 microns. Elemental analysis (wt. per cent) for $Pt_2Si_6C_{24}H_{54}O_3$ showed Theory Pt 41.14; C 30.4; Si 17.7; H 5.7, 0 6.06 Found Pt 41.77; C 30.37; Si 16.92; H 5.86; 0 6.08. No chlorine was detected.

There was placed under vacuum ($10^{-4}$ mm), 0.7 part of the above crystalline platinum-vinylsiloxane. It decomposed at 130°C. There was obtained 0.4 part of organosiloxane of which 90 percent by weight was 1,3-divinyltetra-methyldisiloxane, as identified by its infrared spectrum and gas chromatographic analysis.

Based upon the above results, the crystalline material was a platinum-vinylsiloxane having the formula,

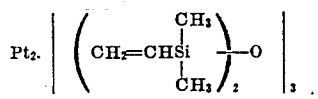

Example 3

A mixture of 35 parts of sodium chloroplatinite $Na_2PtCl_4 \cdot 4H_2O$, 800 parts of 1,3,5,7-tetravinyl-1,3,5,7-tetramethylcyclotetrasiloxane, 150 parts of ethanol and 15 parts of sodium bicarbonate was stirred at 25°C for several hours until the mixture turned from red to yellow. The mixture was then heated slowly to 65°C resulting in gas evolution and then the temperature was gradually raised to 100°C where it was vacuum stripped. The mixture was then allowed to cool and filtered. There was obtained a yellow filtrate. Its infrared spectrum showed absorbence at 7.5 − 7.6 and 8.34 microns. Platinum analysis showed 1.8 percent platinum by weight and chlorine analysis showed it was substantially free of chemically combined chlorine. Based on method of preparation and analysis, the product was a platinum-vinylcyclopolysiloxane of the formula,

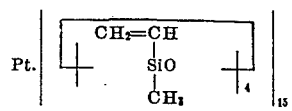

Example 4

There was added 5 parts of No. 4A Linde molecular sieve to a mixture of 0.7 part of $H_2PtCl_6 \cdot H_2O$, 5.0 parts of ethanol and 2 parts of 1,3-divinyltetramethyldisiloxane. The mixture was agitated for a period of 72 hours. There was obtained a mixture having an orange to yellow color with precipitate. Following the addition of 5 parts of benzene to the mixture, it was filtered. The sieve and the precipitate were then washed twice with two additional parts of benzene. The filtrate was then stripped of volatiles by using a nitrogen purge. As the last traces of volatiles were being removed, a light tan colored precipitate separated from the mixture. The product was then mixed with additional benzene and filtered. It was then purged with additional nitrogen to remove the last traces of volatiles. There was obtained 2 parts of a red-brown transparent liquid. Analysis showed that the product was a platinum-vinyldisiloxane substantially free of chemically combined chlorine.

It is evaluated as a hydrosilation catalyst in accordance with the procedure of Example 2. It is found that a platinum containing organopolysiloxane mixture containing the platinum-vinyldisiloxane at concentrations sufficient to provide 10 parts of platinum, per million of mixture shows a considerable reduced no flow time, as compared to the prior art platinum halides employed at significantly higher concentrations.

Example 5

There was added 20 parts of sodium bicarbonate to a mixture of 10 parts of $H_2PtCl_6 \cdot 6H_2O$, 20 parts of 1,3-divinyltetramethyldisiloxane and 50 parts of ethyl alcohol. The mixture was agitated while being refluxed for a period of 30 minutes, and left undisturbed for 15 hours. The mixture was filtered and stripped of volatiles under vacuum. There was obtained 17 parts of a liquid product. It was dissolved in benzene and filtered. The product was a platinum-vinyldisiloxane substantially free of chemically combined chlorine, based on its infrared spectrum and chlorine analysis.

The above platinum-vinyldisiloxane was incorporated into an organopolysiloxane gum to produce a platinum containing organopolysiloxane gum having 10 parts of platinum, per million of gum. The gum was then milled with thirty parts of silicon filler, per 100 parts of gum and cured with 2 parts of benzoyl peroxide. The cured elastomer exhibited superior flame resistant properties as compared to the same cured elastomer composition free of platinum.

Example 6

There was added 2 parts of sodium bicarbonate to a mixture of 2 parts of $Na_2PtCl_4 \cdot 4H_2O$, 2 parts of dimethyldivinylsilane, and 8 parts of ethyl alcohol. When the mixture was stirred, exothermic heat was produced along with a gaseous evolution. The mixture was then heated gently for about 1 minute and then left undisturbed for 10 minutes. Volatiles are then purged from the mixture with nitrogen. There was then added 20 parts of benzene to the mixture and the mixture was filtered and the filtrate was purged with nitrogen of organic solvent. A liquid was obtained which was mixed with a solvent mixture of equal parts by weight of benzene and ethyl alcohol. Analysis of the mixture for chemically combined chlorine and platinum shows a platinum-vinylsiloxane substantially free of chemically combined chlorine. Its infrared spectrum established it is a platinum-vinyldisiloxane of the formula,

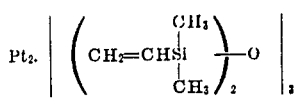

Example 7

Consistent with the teaching of Bruner U.S. Pat. No. 3,105,061, an organopolysiloxane polymer is made by quickly adding 1,3-diacetoxy, 1,3-divinyl, 1,3-dimethyldisiloxane to sym-tetramethyldisiloxane, 1,3-diol to produce a mixture having equal moles of both disiloxanes. The mixture is allowed to stand under atmospheric conditions for about 24 hours and then stripped. Based on method of preparation, there is obtained a polymer having an average of about 300 chemically combined siloxy units, including units of the formula,

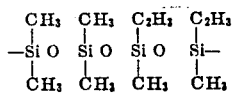

There is added two parts of sodium bicarbonate to a mixture of 4 parts of the above organopolysiloxane, 1 part of $Na_2PtCl_4 \cdot H_2O$ and 8 parts of ethyl alcohol, and 8 parts of benzene. The mixture is allowed to stand under atmospheric conditions for about 1 week. It is then vacuum stripped and mixed with benzene and then filtered. There is obtained a platinum-vinylsiloxane substantially free of chemically combined chlorine having the formula,

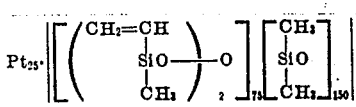

The above platinum-vinylsiloxane is employed as a hydrosilation catalyst in place of the platinum-vinyldisiloxane of example 1. It is found that effective results are achieved.

Although the foregoing examples have been limited to only a few of the very many variables with the scope of the present invention, it should be understood that the present invention is directed to a much broader class of platinum-vinylsiloxanes and methods for making them. For example, a platinum halide and a vinylcyclopolysiloxane included by formula (2) such as,

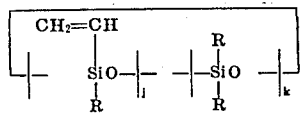

can provide for a much broader class of platinum-vinylcyclopolysiloxanes than shown in example 3. In addition, the examples illustrate only a few of the very many methods which can be employed in the practice of the present invention.

What I claim as new and desire to secure by Letters Patent of the United States is:

1. In an efficient process for the production of organosilicon adducts containing silicon-carbon bonds, comprising contacting (G) a silicon material containing per molecule, at least one hydrogen atom attached to silicon, there being not more than two hydrogen atoms attached to any one silicon atom, and (J) a material containing aliphatic carbon atoms linked by multiple bonds, there is provided by the present invention, the improvement of contacting (G) and (J) in the presence of the platinum-vinylsiloxane essentially free of chemically combined halogen having at least .01 percent by weight platinum of the formula,

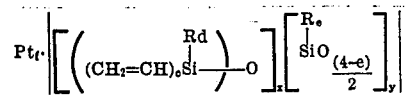

in which the ratio of the average gram atoms of halogen to gram atoms of platinum does not exceed 0.1, where R is selected from the group consisting of alkyl radicals, alkenyl radicals, cycloalkyl radicals, aryl radicals, aralkyl radicals and halogenated radicals of the afore-mentioned types, $c$ is an integer equal to 1 to 3, inclusive, $d$ is a whole number equal to 0 to 2 inclusive, $e$ is a whole number equal to 0 to 3 inclusive, $x$ is an integer equal to 1 to 100 inclusive, $y$ is a whole number equal to 0 to 198, inclusive, and the sum of $x + y$ is equal to 1 to 199 inclusive, and $f$ has a value between about 0.67 to about 67, while $f/x$ has a value up to about 0.67.

2. A method in accordance with claim 1 where the platinum-vinylsiloxane is a platinum-vinyldisiloxane of the formula,

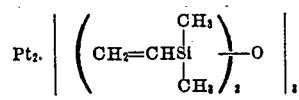

3. A method in accordance with claim 1, where the platinum-vinylsiloxane is a platinum-vinylcyclopolysiloxane of the formula,

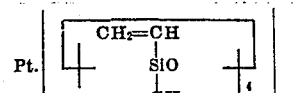

4. A method in accordance with claim 2, where said silicon material containing per molecule, at least one hydrogen atom attached to silicon, is an organopolysiloxane polymer of the formula,

Z is selected from monovalent hydrocarbon radicals, halogenated monovalent hydrocarbon and cyanoalkyl radicals, r has a value equal to 0.0001 to 1 inclusive, s has a value equal to 0 to 2.5 inclusive, and the sum of r and s is equal to 1 to 3 inclusive.

5. A method in accordance with claim 2, utilizing said platinum-disiloxane in a mixture of a polydimethylsiloxane having terminal dimethylvinylsiloxy units and copolymer composed of chemically combined $SiO_2$ units and $H(CH_3)SiO$ units.

6. A method in accordance with claim 2, where said materials containing aliphatic carbon atoms linked by multiple bonds is an organopolysiloxane of the formula,

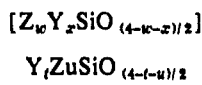

Y is a monovalent aliphatically unsaturated radical selected from aliphatically unsaturated hydrocarbon radicals and halogenated aliphatically unsaturated radicals, Z is selected from monovalent hydrocarbon radicals, halogenated monovalent hydrocarbon and cyanoalkyl radicals, $u$ has a value equal to 0 to 2.5 inclusive, $t$ has a value equal to 0.001 to 1 inclusive, and the sum of $t$ and $u$ is equal to 1 to 3 inclusive.

7. In an efficient process for the production of organosilicon adducts containing silicon-carbon bonds, comprising contacting (G) a silicon material containing per molecule, at least one hydrogen atom attached to silicon, there being not more than two hydrogen atoms attached to any one silicon atom, and (J) a material containing aliphatic carbon atoms linked by multiple bonds, there is provided by the present invention, the improvement of contacting (G) and (J) in the presence of a platinum-vinylsiloxane essentially free of chemically combined halogen having at least 0.01 percent by weight platinum of the formula,

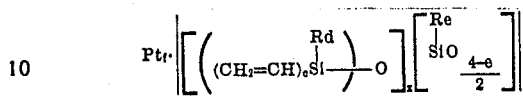

which platinum-vinylsiloxane is substantially free of chemically combined halogen, where R is selected from the group consisting of alkyl radicals, alkenyl radicals, cycloalkyl radicals, aryl radicals, aralkyl radicals and halogenated radicals of the afore-mentioned types, $c$ is an integer equal to 1 to 3, inclusive, $d$ is a whole number equal to 0 to 2, inclusive, $e$ is a whole number equal to 0 to 3 inclusive, $x$ is an integer equal to 1 to 100 inclusive, $y$ is a whole number equal to 0 to 198 inclusive, and the sum of $x + y$ is equal to 1 to 199 inclusive, and $f$ has a value between about 0.67 to about 67, while $f/x$ has a value up to about 0.67.

* * * * *

Disclaimer

3,715,334.—*Bruce D. Karstedt,* Scotia, N.Y. PLATINUM-VINYLSILOXANES. Patent dated Feb. 6, 1973. Disclaimer filed Apr. 19, 1983, by the assignee, *General Electric Co.*

Hereby enters this disclaimer to claims 1 through 6 of said patent.

[*Official Gazette June 21, 1983.*]